US009120045B2

(12) United States Patent
Wieslander et al.

(10) Patent No.: US 9,120,045 B2
(45) Date of Patent: Sep. 1, 2015

(54) SINTER PLANT GAS CLEANING SYSTEM

(71) Applicant: ALSTOM Technology Ltd, Baden (CH)

(72) Inventors: Peter Wieslander, Vaxjo (SE); Lena Loren, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/279,837

(22) Filed: May 16, 2014

(65) Prior Publication Data

US 2014/0245883 A1    Sep. 4, 2014

Related U.S. Application Data

(63) Continuation of application No. PCT/IB2012/056266, filed on Nov. 8, 2012.

(30) Foreign Application Priority Data

Nov. 25, 2011    (EP) .................................. 11190698

(51) Int. Cl.
| | | |
|---|---|---|
| *B01D 46/46* | (2006.01) | |
| *B01D 53/34* | (2006.01) | |
| *B01D 53/50* | (2006.01) | |
| *B01D 53/70* | (2006.01) | |

(Continued)

(52) U.S. Cl.
CPC ................ *B01D 46/46* (2013.01); *B01D 46/42* (2013.01); *B01D 53/346* (2013.01);
(Continued)

(58) Field of Classification Search
CPC ...................... F27B 1/00; F27B 1/005; B01D 27/10–27/108; B01D 2258/025; B01D 46/42; B01D 46/46; B01D 53/346; B01D 53/508; B01D 53/70; B01D 53/72; B01D 53/79; B01D 53/83; B01D 2257/2064; B01D 2257/302; B01D 2257/7022; B01D 2257/7027; B01D 2257/708; B01D 2251/304; B01D 2251/404; B01D 2251/604; B01D 2251/606; B03C 2201/04; B03C 2201/10; B03C 3/017; B03C 3/08

USPC ............... 95/1–24; 96/388–407; 75/313–327, 75/356, 383, 751–769; 55/361–382, 55/341.1–341.7

See application file for complete search history.

(56) References Cited

U.S. PATENT DOCUMENTS

| | | |
|---|---|---|
| 3,426,509 A | 2/1969 | Wilhelmsson |
| 4,336,035 A | 6/1982 | Evenstad et al. |

(Continued)

FOREIGN PATENT DOCUMENTS

| | | |
|---|---|---|
| EP | 0 908 222 | 4/1999 |
| EP | 1 035 224 | 9/2000 |

(Continued)

OTHER PUBLICATIONS

Improved Flue-Gas Cleaning by Bag Filter at the Sinter Strand of Voestalpine Stahl Donawitz, Elmer Schuster et al., 3rd International Conference on Science and Technology of Ironmaking, METEC Congress 03, Jun. 16-20, 2003.

*Primary Examiner* — Thomas McKenzie

(57) ABSTRACT

A sinter plant gas cleaning system includes a fabric filter device for removing dust particles from a process gas drawn from a sinter strand of a sinter plant. A duct is adapted to allow the process gas drawn from the sinter strand to pass by the fabric filter device. A measurement device measures a concentration of organic compounds of the process gas drawn from the sinter strand. A control system receives a signal from the measurement device and controls the flow of process gas through the duct.

17 Claims, 2 Drawing Sheets

(51) Int. Cl.
*B01D 53/72* (2006.01)
*B01D 53/79* (2006.01)
*B01D 53/83* (2006.01)
*B03C 3/017* (2006.01)
*B03C 3/08* (2006.01)
*B01D 46/42* (2006.01)

(52) U.S. Cl.
CPC .............. *B01D 53/508* (2013.01); *B01D 53/70* (2013.01); *B01D 53/72* (2013.01); *B01D 53/79* (2013.01); *B01D 53/83* (2013.01); *B03C 3/017* (2013.01); *B03C 3/08* (2013.01); *B01D 2251/304* (2013.01); *B01D 2251/404* (2013.01); *B01D 2251/604* (2013.01); *B01D 2251/606* (2013.01); *B01D 2257/2064* (2013.01); *B01D 2257/302* (2013.01); *B01D 2257/708* (2013.01); *B01D 2257/7022* (2013.01); *B01D 2257/7027* (2013.01); *B01D 2258/025* (2013.01); *B03C 2201/04* (2013.01); *B03C 2201/10* (2013.01)

(56) References Cited

U.S. PATENT DOCUMENTS

| | | | |
|---|---|---|---|
| 4,502,872 | A | 3/1985 | Ivester et al. |
| 5,365,866 | A * | 11/1994 | Von Seebach et al. ........ 110/345 |
| 5,827,484 | A | 10/1998 | Herden et al. |
| 6,076,476 | A | 6/2000 | Yano et al. |
| 2002/0152937 | A1 * | 10/2002 | Logan et al. .................. 110/341 |
| 2006/0101996 | A1 * | 5/2006 | Paxton et al. ..................... 95/87 |
| 2008/0175775 | A1 * | 7/2008 | Fleischanderl et al. ........ 423/210 |
| 2009/0283016 | A1 * | 11/2009 | Mohamed et al. ............ 106/638 |
| 2012/0192718 | A1 * | 8/2012 | Sukhman et al. ............... 95/287 |

FOREIGN PATENT DOCUMENTS

| | | |
|---|---|---|
| EP | 2 292 315 | 3/2011 |
| WO | 2010/034791 | 4/2010 |
| WO | 2010/092035 | 8/2010 |

* cited by examiner

SINTER PLANT GAS CLEANING SYSTEM

CROSS-REFERENCE TO RELATED APPLICATIONS

This application claims priority to PCT/IB2012/056266 filed Nov. 8, 2012, which claims priority to European application 11190698.8 filed Nov. 25, 2011, both of which are hereby incorporated in their entireties.

TECHNICAL FIELD

The present invention relates to a method of controlling a sinter plant gas cleaning system comprising a fabric filter device for removing dust particles from a process gas drawn from a sinter strand of a sinter plant.

The present invention further relates to a sinter plant gas cleaning system comprising a fabric filter device for removing dust particles from a process gas drawn from a sinter strand of a sinter plant.

BACKGROUND

A sinter plant produces a material called sinter which is supplied to a blast furnace for manufacturing industrial metals, such as iron. In a sinter plant a mix of blended ores, fluxes and coke is supplied to a sinter strand, which is a conveyor, and is ignited. The sinter is formed as the ignited mix of ores, fluxes and coke travels along the sinter strand. A fan system draws, via wind boxes, process gas from the sinter strand. The process gas drawn from the sinter strand contains dust particles.

In US 2008/0175775 is disclosed a gas cleaning system comprising a fabric filter device which removes dust particles from gas drawn from a sinter strand. A gas conditioner is arranged upstream of the fabric filter device. Water and air is forwarded to the gas conditioner to provide a suitable temperature and humidity for the fabric filter device.

While the gas cleaning system disclosed in US 2008/0175775 may be efficient in removing dust particles, it also results in a high pressure drop, which increases the operating costs of the sinter plant.

SUMMARY

An object of the present invention is to provide a method of cleaning a process gas drawn from a sinter strand of a sinter plant, the method being more efficient than the method of the prior art.

This object is achieved by means of a method of controlling a sinter plant gas cleaning system comprising a pre-collector device and a fabric filter device for removing dust particles from a process gas drawn from a sinter strand of a sinter plant, the method comprising:

measuring a concentration of organic compounds of the process gas drawn from the sinter strand, and controlling, based on the measured concentration of organic compounds of the process gas, a flow of process gas by-passing the fabric filter device.

An advantage of this method is that efficient removal of dust particles from a sinter plant process gas can be achieved, still avoiding, or at least reducing, problems of reduced permeability of fabric filtering units of the fabric filter device, and fire hazards.

According to one embodiment the method further comprises controlling, based on the measured concentration of organic compounds of the process gas, a supply of an additive comprising an alkaline substance to the process gas upstream of the fabric filter device. An advantage of this embodiment is that problems related to reduction in permeability of fabric filtering units can be reduced also at occasions when it is not desirable to by-pass the entire flow of process gas over the fabric filter device.

According to one embodiment the method further comprises supplying an additive to the process gas upstream of the fabric filter device in an amount which corresponds to 100-1000, preferably 200-400, mg of the alkaline substance per $Nm^3$ of dry process gas. An advantage of this embodiment is that negative effects, such as reduced permeability of fabric and increased risk of fire, of the organic compounds of the process gas released from the sinter strand during normal operation of the sinter plant are counteracted by the alkaline substance of the additive, thereby further reducing the risk of reduced permeability of the fabric filtering units, and fire hazards. An amount of less than 100 mg of the alkaline substance per $Nm^3$ of dry process gas would often not be sufficient for efficiently counteracting the negative effects of organic compounds of the process gas. An amount of more than 1000 mg of the alkaline substance per $Nm^3$ of dry process gas would usually increase the operating costs and the amount of waste material generated, without further serving to protect the fabric filtering units from unwanted interaction with organic compounds of the process gas.

According to one embodiment the method further comprises supplying an additive comprising an alkaline substance to the process gas upstream of the fabric filter device during at least 50% of the time that the process gas is allowed to pass through the fabric filter device. An advantage of this embodiment is that an incoming flow of process gas, comprising organic compounds, is, for a substantial portion of the time of passing such gas through the fabric filter device, matched with a supply of additive comprising an alkaline substance to counteract the negative effects of such organic compounds.

According to one embodiment the step of measuring a concentration of organic compounds of the process gas comprises measuring a concentration of Non Methanic Volatile Organic Compounds (NMVOC). An advantage of this embodiment is that those organic compounds, namely the Non Methanic Volatile Organic Compounds, which are the most relevant with respect to problems related to reduced permeability and fire hazard of the fabric filter device, are measured and utilized for controlling the operation of the gas cleaning system.

According to one method embodiment the step of controlling the flow of process gas by-passing the fabric filter device further comprises comparing the measured concentration of organic compounds of the process gas to a set point, and increasing the amount of the process gas by-passing the fabric filter device when the measured concentration of organic compounds of the process gas exceeds the set point. An advantage of this embodiment is that the fabric filter device is protected from being exposed to the process gas when the same comprises high amounts of organic compounds. Thereby, the risk of reduced permeability and fire in the fabric filter device is reduced in a controlled and predictable manner.

According to one embodiment the method further comprises comparing a measured concentration of Non Methanic Volatile Organic Compounds (NMVOC) to a set point for NMVOC, the set point being 100 mg, or less, of NMVOC per $Nm^3$ dry process gas, and causing at least 50% of the process gas to by-pass the fabric filter device when the measured concentration of NMVOC exceeds the set point. A set point of 100 mg of NMVOC per $Nm^3$ dry process gas, or lower, has been found suitable to obtain an efficient balance between low exposures of the fabric filtering units to organic compounds on the one hand, and low emissions of dust particles to ambient air on the other hand. According to one embodiment, the set point is selected to be in the range of 20-100 mg of NMVOC per Nm$^3$ dry process gas.

According to one embodiment the method further comprises recirculating at least a portion of an amount of dust particles collected in the fabric filter device and mixing the recirculated dust particles with process gas about to enter the fabric filter device. An advantage of this embodiment is that recirculating at least a portion of the dust particles collected in the fabric filter device may reduce the consumption of fresh additive, or even eliminate the need for fresh additive.

A further object of the present invention is to provide a sinter plant gas cleaning system which is more efficient for cleaning a sinter plant process gas than the gas cleaning systems of the prior art.

This object is achieved by a sinter plant gas cleaning system comprising a fabric filter device for removing dust particles from a process gas drawn from a sinter strand of a sinter plant. The sinter plant gas cleaning system further comprises
  a pre-collector device for removing dust particles from the process gas drawn from the sinter strand of the sinter plant,
  a by-pass duct adapted to allow at least a portion of the process gas drawn from the sinter strand to by-pass the fabric filter device,
  a measurement device for measuring a concentration of organic compounds of the process gas drawn from the sinter strand, and
  a control system adapted to receive a signal from the measurement device and to control, in view of the signal received, the flow of process gas passing through the by-pass duct.

An advantage of this sinter plant gas cleaning system is that the process gas may be cleaned in a very efficient manner, with low gas pressure drop, due to low reduction of permeability of the fabric filtering units, and low risks of fire.

According to one embodiment the gas cleaning system further comprises an additive supply system for supplying an additive comprising an alkaline substance to the process gas upstream of the fabric filter device. An advantage of this embodiment is that negative effects of organic compounds of the process gas may be at least partially counteracted, such that the amount of the process gas being by-passed over the fabric filter device can be reduced.

According to one embodiment the control system is adapted to receive a signal from the measurement device and to control, in view of the signal received, an amount of additive comprising an alkaline substance supplied by the additive supply system. An advantage of this embodiment is that efficient utilization of the alkaline substance may be achieved.

According to one embodiment the pre-collector device is fluidly connected in series with the by-pass duct, such that dust particles are removed from the process gas also when a flow of process gas by-passes the fabric filter device. An advantage of this embodiment is that a certain removal of dust particles from the process gas will be ensured also on occasions of by-passing the entire flow of the process gas, or a portion of the flow of the process gas, over the fabric filter device. The pre-collector device could, for example, be an electrostatic precipitator or a multi-cyclone unit. According to one embodiment, the pre-collector device is arranged upstream, as seen with respect to the transport direction of the process gas, of the fabric filter device. An advantage of this embodiment is that particles that are potentially harmful to the fabric filter device, such as live coal particles and sparkles, may be removed from the process gas before the process gas enters the fabric filter device.

According to one embodiment the measurement device is adapted to measure the concentration of organic compounds in or upstream of a gas splitting point at which the process gas is distributed between the by-pass duct and the fabric filter device. An advantage of this embodiment is that the concentration of organic compounds of the process gas can be measured both when the process gas is forwarded through the fabric filter device, and when the process gas is forwarded through the by-pass duct.

Further objects and features of the present invention will be apparent from the following detailed description and claims.

BRIEF DESCRIPTION OF THE DRAWINGS

The invention is described in more detail below with reference to the appended drawings in which.

DETAILED DESCRIPTION

Figure 1:
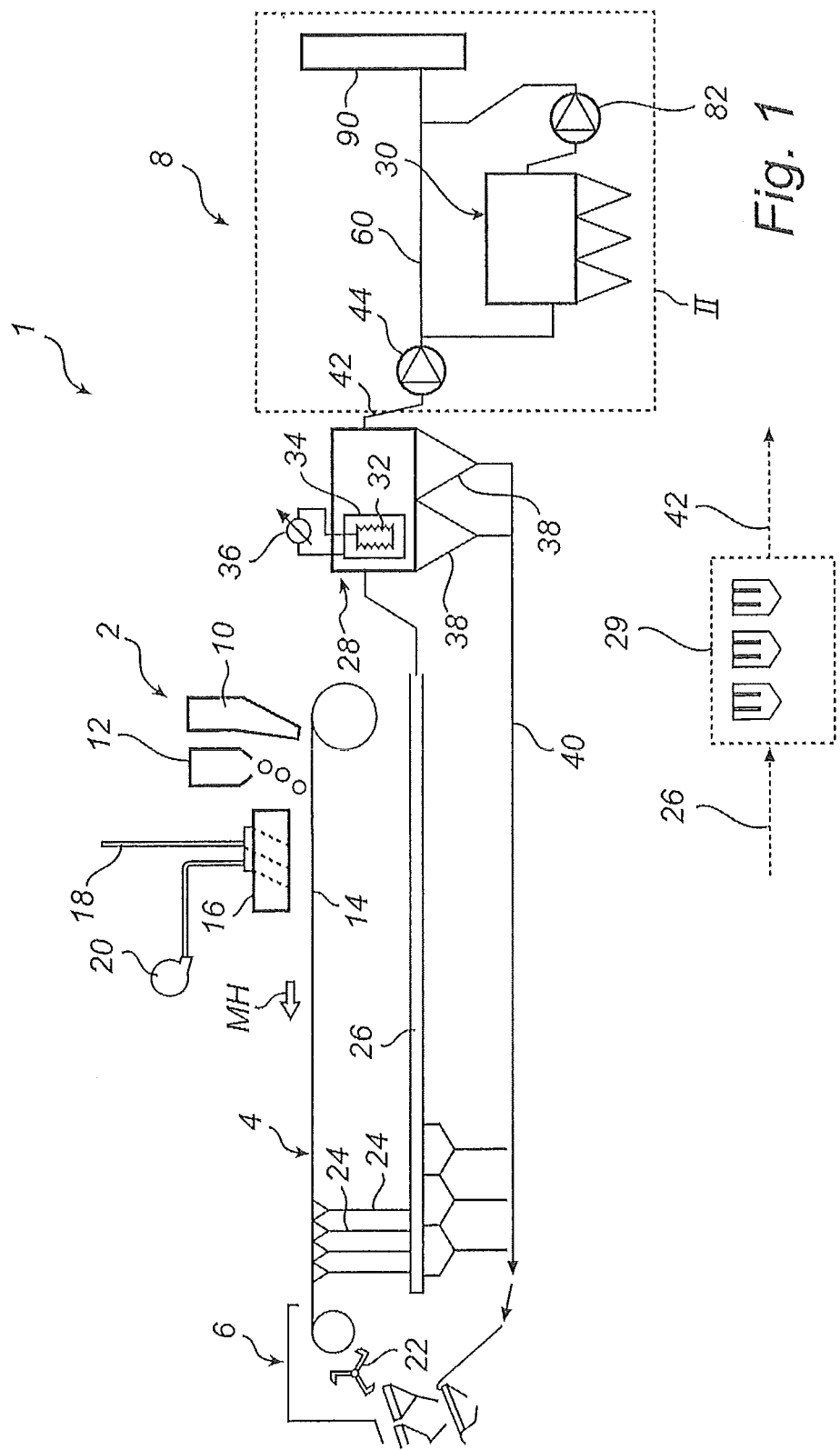
FIG. 1 is a schematic side view and illustrates a sinter plant.

FIG. 1 illustrates a sinter plant 1 which produces sinter for use in, for example, a blast furnace for iron production. The sinter plant 1 comprises, as its main components, a feeding station 2, a sinter strand 4, a sinter collecting station 6, and a sinter plant gas cleaning system 8.

The feeding station 2 comprises at least a first feeder 10, adapted to supply a layer of sintered material, sometimes referred to as a hearth layer, and a second feeder 12, adapted to supply a raw mix of coke, a blend of ores, returned fines, and fluxes. The hearth layer fed from the first feeder 10 is collected on a conveyor 14 of the sinter strand 4 and forms an insulating and protecting material on the conveyor 14. The raw mix is fed from the second feeder 12 on top of the hearth layer and is moved horizontally as indicated by arrow MH in FIG. 1. The sinter strand 4 further comprises an ignition box 16 which is provided with a fuel feeder 18 supplying a fuel, such as natural gas, and an ignition box fan 20 supplying air to the ignition box 16. The natural gas supplied via fuel feeder 18 is combusted in the ignition box 16 upon contact with air, and ignites the material travelling horizontally below ignition box 16. After being ignited the material fed from feeders 10, 12 gradually sinter in conjunction with travelling towards sinter collecting station 6. At sinter collecting station 6 the sinter is collected, crushed by crusher 22, and divided into various size fractions. Size fractions of a desired size are transported to, for example, a blast furnace or an electric arc furnace, for producing a metal, such as iron or magnesium, from the sinter, and fines are returned to the second feeder 12.

The sinter strand 4 further comprises a number of wind boxes 24, of which only a few are illustrated in FIG. 1, arranged under the conveyor 14 for drawing process gas, sometimes referred to as flue gas, from the material being sintered on the conveyor 14. The wind boxes 24 are fluidly connected to a common gas collecting duct 26. The common gas collecting duct 26 transports the flue gas collected in the wind boxes 24 to the gas cleaning system 8.

The sinter plant gas cleaning system 8 comprises as its main components a dust pre-collector device 28 in the form of an electrostatic precipitator 28, and a fabric filter device 30. By "fabric filter device" is meant a filter comprising at least one fabric filtering unit, which may be a fabric bag, or a fabric pocket, comprising a fabric, which may, for example, be made by weaving, knitting, spreading, crocheting, or bonding. Upon filtering the process gas in the fabric filter device 30, the process gas passes through the fabric, causing dust particles to be collected on the fabric of the fabric filtering units.

The electrostatic precipitator 28 comprises at least one discharge electrode 32 and at least one collecting electrode plate 34. A power supply device 36 supplies a voltage between the discharge electrodes 32 and the collecting electrode plates 34. Typically, the electrostatic precipitator 28 would comprise 2 to 100 discharge electrodes 32, and 2 to 100 collecting electrode plates 34. Dust particles travelling through the electrostatic precipitator 28 become charged by the discharge electrodes 32 and are subsequently collected on the collecting electrode plates 34. A thorough description of an example of an electrostatic precipitator can be found in U.S. Pat. No. 4,502,872. Occasionally, cakes of collected dust particles are removed from the collecting electrode plates 34, for example by shaking the plates 34. The cakes thus removed are collected in hoppers 38 of the electrostatic precipitator 28, and are transported to the crushing station 22 via a fluidly connected transport pipe 40 for further handling and return to the feeding station 2. Flue gas collected from the wind boxes 24 is forwarded, via fluidly connected collecting duct 26, to the electrostatic precipitator 28 in which typically 60-99.5% of the total amount of dust particles of the collected flue gas is removed and returned to the sinter strand 4. According to one embodiment the dust particle concentration of the flue gas leaving the electrostatic precipitator 28 is less than 400 mg of dust particles per $Nm^3$ dry process gas. The at least partially cleaned flue gas leaves the electrostatic precipitator 28 via fluidly connected duct 42. A first suction fan 44 is connected to the duct 42. The first suction fan 44 draws gas through the material on the conveyor 14, and further through wind boxes 24, collecting duct 26, and electrostatic precipitator 28.

According to an alternative embodiment, the dust pre-collector device could be a cyclone separator, or a battery of cyclone separators arranged in, for example, a multi-cyclone unit 29 arranged for receiving flue gas from fluidly connected duct 26. An example of a multi-cyclone unit is described in U.S. Pat. No. 3,426,509.

The arrangement of the fabric filter device 30 will be described in more detail hereinafter with reference to FIG. 2.

Figure 2:
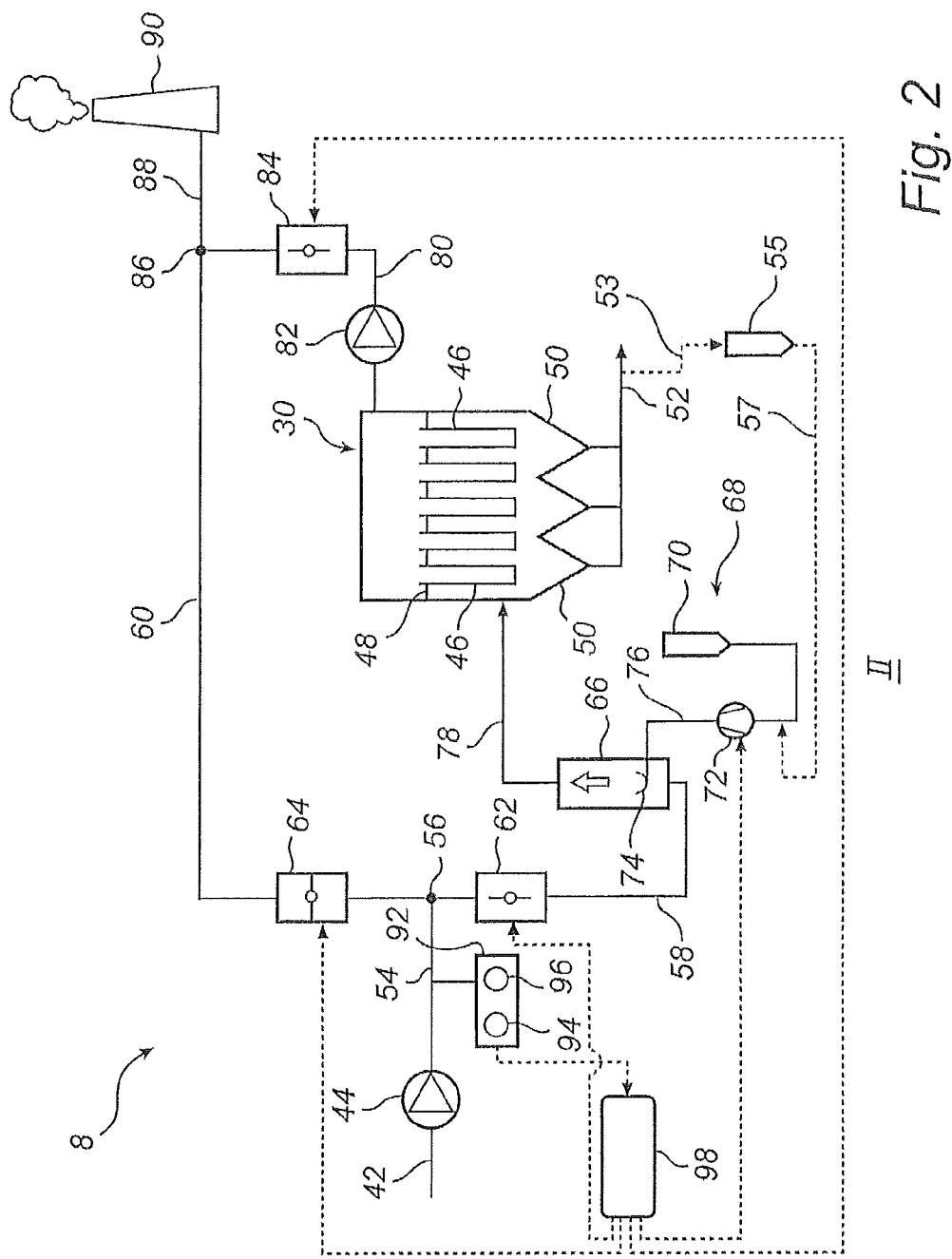
FIG. 2 is an enlarged view of the area II of FIG. 1.

FIG. 2 illustrates the fabric filter device in the form of a bag filter 30. The bag filter 30 comprises a number of fabric filtering units 46 that may have the form of fabric bags 46 arranged in a cell plate 48. Dust particles of the flue gas are collected on the outside of the bags 46 and form dust cakes. A thorough description of an example of a bag filter can be found in U.S. Pat. No. 4,336,035. Occasionally, the bags 46 are, for example, shaken, or exposed to a pulse of pressurized air, to make cakes of collected dust fall off. The collected dust is collected in hoppers 50 from which it may be transported away for disposal, or reuse, via a fluidly connected disposal pipe 52. It will be appreciated that other types of fabric filter devices could also be utilized as the fabric filter device 30.

The first suction fan 44 transports flue gas from duct 42 to a fluidly connected duct 54. Fluidly connected duct 54 transports the gas further to a gas splitting point 56. A fabric filter supply duct 58 and a by-pass duct 60 are fluidly connected to the gas splitting point 56. The fabric filter supply duct 58 is provided with a fabric filter inlet damper 62, which is open in the occasion illustrated in FIG. 2. The by-pass duct 60 is provided with a by-pass damper 64 which is closed in the occasion illustrated in FIG. 2. Hence, in the occasion illustrated in FIG. 2, the flue gas is forwarded via the fabric filter supply duct 58, and not via the by-pass duct 60.

The fabric filter supply duct 58 is arranged for forwarding the flue gas to a contact reactor 66. An additive supply system 68 is arranged for supplying an additive comprising an alkaline substance to the contact reactor 66.

The alkaline substance may be selected from a group of alkaline substances comprising: hydrated lime, $Ca(OH)_2$, limestone, $CaCO_3$, sodium carbonate, $Na_2CO_3$, sodium bicarbonate, $NaHCO_3$, fly ash collected from flue gases of a coal fired power boiler, fly ash collected from a biomass fired power boiler, and mixtures thereof. In the following example reference is given to an alkaline substance in the form of hydrated lime, $Ca(OH)_2$. Typically, the alkaline substance would have the form of a particulate material. It is also possible to supply the alkaline substance as a slurry or solution, for example as a slurry of hydrated lime, to the flue gas, wherein such slurry or solution forms a particulate material upon contact with the hot flue gas.

The additive supply system 68 comprises an additive storage device in the form of an additive silo 70, an additive supply device in the form of a blower 72, and an additive distribution device in the form of an additive nozzle 74. The blower 72 draws an additive-air mixture from the silo 70 via a supply pipe 76 and forwards such mixture to the additive nozzle 74. The additive nozzle 74 is arranged inside the contact reactor 66 and mixes the additive with flue gas passing upwards through the reactor 66.

In addition to an alkaline substance, which may, for example, be hydrated lime, $Ca(OH)_2$, the additive may comprise further components, such as activated carbon, coke, zeolites etc. Such further components may be included in the additive to cause an adsorption and removal of pollutants such as dioxins, PCDD, and furans, PCDF, in the fabric filter device 30.

The flue gas mixed with additive leaves the contact reactor 66 via fluidly connected duct 78 and is forwarded to fluidly connected bag filter 30. In bag filter 30 typically 95-99.99% of the total amount of dust particles of the gas entering bag filter 30 via duct 78 is removed. Additionally, the additive supplied may cause a removal of at least a portion of the gaseous pollutants, such as hydrocarbons. A cleaned gas leaves bag filter 30 via a fluidly connected clean gas duct 80. A second suction fan 82 is arranged in clean gas duct 80 for drawing gas through the bag filter 30. Furthermore, the clean gas duct 80 is provided with a fabric filter outlet damper 84, which is open in the occasion illustrated in FIG. 2. Clean gas duct 80 and by-pass duct 60 merge at fluidly connected gas collecting point 86. A stack supply duct 88 is fluidly connected to collecting point 86 for forwarding the gas to a fluidly connected stack 90 from which the gas is released to the atmosphere.

The gas cleaning system 8 further comprises a measurement station 92, which is arranged for measuring a property of the gas forwarded in the duct 54. The measurement station 92 is operative for measuring, directly or indirectly, a parameter which is related to the concentration of organic compounds of the flue gas transported in the duct 54. In one embodiment, the measurement station 92 may be operative for measuring the concentration of Non Methanic Volatile Organic Compounds (NMVOC) of the process gas. NMVOC include various organic substances, such as aliphatic compounds, phenols, olefins, and aromatic substances that may be formed due to incomplete combustion of, for example, mill scale and anthracite that enter the sinter strand 4 as part of the raw mix of coke, blend of ores, returned fines, and fluxes supplied from the second feeder 12 illustrated in FIG. 1. Methane is normally not included in NMVOC. It has been found that the NMVOC concentration of the flue gas influences the operational characteristics of the bag filter 30 significantly, and that controlling the operation of the gas cleaning system 8 in a manner which will be described hereinafter will enable efficient and reliable operation of the gas cleaning system.

According to one embodiment the measurement station 92 would include a first instrument 94 for measuring the total concentration of organic compounds of the flue gas forwarded in the duct 54, and a second instrument 96 for measuring the concentration of methane of the flue gas forwarded in the duct 54. An example of the first instrument 94 is Siemens FIDAMAT 6 analyzer, which is available from Siemens AG, Karlsruhe, DE. An example of the second instrument 96 is Siemens ULTRAMAT 23 IR-analyzer, which is available from Siemens AG, Karlsruhe, DE. By subtracting the amount of methane as measured by the second instrument 96 from the total amount of organic compounds as measured by the first instrument 94 the concentration of NMVOC is obtained. If, for example, the first instrument 94 measures a total amount of organic compounds of 80 mg per $Nm^3$ of dry flue gas, and the second instrument 96 measures a concentration of methane, $CH_4$, of 25 mg per $Nm^3$ of dry flue gas, then the concentration of NMVOC is 80−25=55 mg per $Nm^3$ of dry flue gas.

As a further alternative, the measurement station 92 may comprise a Thermo Scientific Model 55i analyzer analyzing methane and non-methane hydrocarbons. The Thermo Scientific Model 55i analyzer is available from Thermo Scientific, Franklin, Mass., USA.

The measurement station 92 is adapted to send a signal comprising information on the measured concentration of NMVOC to a control system 98. The control system 98 is adapted to receive the information from the measurement station 92 and to determine whether or not any measures have to be taken. The control system 98 may, for example, compare the measured concentration of NMVOC to a set point therefore. Such NMVOC set point could, for example, be 100 mg, or less, of NMVOC per $Nm^3$ dry process gas. According to one preferred embodiment, the set point for NMVOC is selected to be within the range of 20 to 100 mg of NMVOC per $Nm^3$ dry process gas.

In one example, the set point for NMVOC is 60 mg of NMVOC per $Nm^3$ dry process gas. If, in such example, the measured concentration of NMVOC is between 0 and 60 mg NMVOC per $Nm^3$ of dry gas, the control system 98 controls the additive supply system 68 to supply additive to the contact reactor 66 in an amount which corresponds to 100-1000, more preferably 200-400, mg of an alkaline substance, for example $Ca(OH)_2$, per $Nm^3$ of dry gas entering contact reactor 66 via duct 58. By "dry gas", abbreviated "d.g.", is meant that any water vapour of the flue gas is disregarded when calculating the amounts. The additive comprising, for example, $Ca(OH)_2$, could be supplied to the flue gas from the additive supply system 68 in a continuous, semi-continuous, or batch-wise manner. Preferably, the additive comprising the alkaline substance, such as $Ca(OH)_2$, is supplied during at least 50% of the time that the process gas is allowed to pass through the fabric filter device 30.

It has been found that a supply of an alkaline substance, such as hydrated lime, $Ca(OH)_2$, reduces, or even prevents, the effect of NMVOC of the flue gas condensing and getting stuck on the fabric of the bags 46. Condensation of NMVOC on the fabric of the bags 46 may result in decreased permeability of the bags 46, a phenomenon sometimes referred to as "bag blinding", which results in an increased power required in fan 82 for drawing gas through the bag filter 30. A condensation of NMVOCs may even result in fires in the bag filter 30.

A fire in the bag filter 30 could cause severe health risks and very costly damages to the sinter plant 1. The alkaline substance appears to form a porous cake on the fabric bags 46, such cake appearing to be very efficient in capturing organic compounds, and preventing the organic compounds from causing bag blinding. The alkaline substance also appears to reduce the risk of auto-ignition and glow fires in material collected on the fabric bags 46.

In addition to protecting the fabric of the bags 46, the alkaline substance may also react with sulphur dioxide, $SO_2$, contained in the flue gas to form a solid reaction product which is collected on the bags 46. Hence, at least a portion of a sulphur dioxide content of the flue gas may be separated in the fabric filter device 30.

The control system 98 could control the additive supply system 68 in various ways. In accordance with one embodiment, the control system 98 could control the additive supply system 68 to supply a constant amount, such as 350 mg of alkaline substance, for example $Ca(OH)_2$, per $Nm^3$ of dry gas entering contact reactor 66, as long as the measured concentration of NMVOC is between 0 and 60 mg NMVOC per $Nm^3$ of dry flue gas.

According to an alternative embodiment, the control system 98 could control the additive supply system 68 to supply a varying amount of alkaline substance depending on the present concentration of organic compounds of the flue gas, as measured by the measurement station 92. Such supply could be based on assumed or empirically found data regarding that portion of the organic compounds that could be expected to condense in the bag filter 30. The amount of alkaline substance supplied should preferably be a factor of at least 10, more preferably at least 15, times the condensable amount of organic compounds. If, for example, the measurement station 92 measures a concentration of total organic compounds of 100 mg per $Nm^3$ of dry flue gas, and it is assumed, based on previous experiences or tests, that 30% of the total amount of organic compounds is condensable at the present operating temperature, for example 100° C., of the bag filter 30, then the amount of alkaline substance supplied should be: 100 mg total organic compound per $Nm^3$ of dry gas×0.30×factor of 10=300 mg of alkaline substance, for example $Ca(OH)_2$, per $Nm^3$ of dry flue gas.

According to further alternative embodiment, the control system 98 could control the additive supply system 68 to supply a varying amount of alkaline substance depending on the present concentration of measured NMVOC. A relation between measured concentration of NMVOC and amount of alkaline substance, for example $Ca(OH)_2$, supplied could be linear, for example:

$$\text{mg of Ca(OH)}_2 \text{ per Nm}_3 \text{ d.g.} = \text{mg NMVOC per Nm}_3 \text{ d.g.} * 5 + 100$$

In that case a measured NMVOC concentration of 50 mg/$Nm^3$ d.g. would cause the control system 98 to send a signal to the additive supply system 68 to supply an amount of $Ca(OH)_2$ that would correspond to: 50×5+100=350 mg $Ca(OH)_2$ per $Nm^3$ of dry flue gas. Also other relations, including non-linear and step wise relations, between the measured concentration of NMVOC and the supply of alkaline substance could be utilized.

It has been found that the concentration of NMVOC may sometimes reach such high levels that supply of alkaline substance is not sufficient to avoid, or at least reduce, problems with decreased permeability of the bags 46, and/or fire hazards. In such instances, the control system 98 sends signals to the fabric filter inlet damper 62 and the fabric filter outlet damper 84 to close, and to the by-pass damper 64 to open, such that the flue gas flows from the fluidly connected duct 54 to the stack 90 via the fluidly connected by-pass duct 60, and not via the bag filter 30. The dust pre-collector device, in the form of the electrostatic precipitator 28 illustrated in FIG. 1, is separate from the fabric filter device 30, and is fluidly connected in series with the by-pass duct 60, such that at least a portion of the amount of dust particles are removed from the flue gas also when the flue gas by-passes the fabric filter device 30.

The control system 98 could be arranged to effect such directing of the flue gas flow through the by-pass duct 60 when the measured concentration of NMVOC exceeds a certain concentration, such as an NMVOC set point of 60 mg NMVOC per $Nm^3$ of dry flue gas. The flue gas would then flow through the by-pass duct 60 until the measured concentration of NMVOC, as measured by measurement station 92, falls below 60 mg NMVOC per $Nm^3$ of dry flue gas. When the flue gas is made to flow through the by-pass duct 60, the control system 98 controls the additive supply system 68 to reduce or even stop the supply of additive comprising an alkaline substance to the contact reactor 66. Hence, the concentration of NMVOC in the flue gas is measured upstream of the bag filter 30, preferably continuously, during the operation of the sinter plant 1. With low to moderate concentrations of NMVOC in the flue gas, risks of decreased permeability of fabric bags 46 and fire in the filter 30 are handled by supplying an additive comprising an alkaline substance to the flue gas upstream of the filter 30, and at high concentrations of NMVOC in the flue gas, the flue gas is at least partially by-passed over the filter 30.

Optionally, a portion of the dust collected in the hoppers 50 may be recirculated back to the fabric filter device 30. In such an event, a portion of the dust collected in the hoppers 50 is forwarded, via a pipe 53, to a rest-product silo 55. The rest-product silo 55 is, via a pipe 57, connected to the supply pipe 76, such that dust collected in fabric filter device 30 could be transported to the contact reactor 66 for being again mixed with the flue gas. A recirculation of a portion of the dust collected in fabric filter device 30 may, in those situations in which the collected dust contains alkaline substance still useful for protecting the fabric filter device 30, reduce the consumption of fresh additive supplied from the additive silo 70. A recirculation of a portion of the dust collected in fabric filter device 30 may also increase the removal of sulphur dioxide in the filter device 30.

It will be appreciated that numerous variants of the embodiments described above are possible within the scope of the appended claims.

Hereinbefore it has been described that the entire flow of process gas is forwarded via the by-pass duct 60 when the concentration of NMVOC exceeds the NMVOC set point. It will be appreciated that it is also possible to allow a first portion of the process gas to pass through the by-pass duct 60, and a second portion of the process gas to pass through the fabric filter device 30. For example, the control system 98 could be adapted to control the dampers 62, 64, 84 in such manner that the entire flow of process gas is forwarded through the fabric filter device 30 when the measured concentration of NMVOC is between 0 and 60 mg NMVOC per $Nm^3$ of dry gas. When the measured concentration of NMVOC is between 60 and 100 mg NMVOC per $Nm^3$ of dry gas then 50% of the process gas is forwarded through the fabric filter device 30 and 50% of the process gas is forwarded via the by-pass duct 60. Finally, when the measured concentration of NMVOC is more than 100 mg NMVOC per $Nm^3$ of dry gas the entire flow of process gas is forwarded via the by-pass duct 60.

To summarize, a sinter plant gas cleaning system 8 comprises a fabric filter device 30 for removing dust particles from a process gas drawn from a sinter strand 4 of a sinter plant 1. A duct 60 is adapted to allow the process gas drawn from the sinter strand 4 to pass by the fabric filter device 30. A measurement device 92 measures a concentration of organic compounds of the process gas drawn from the sinter strand 4. A control system 98 receives a signal from the measurement device 92 and controls the flow of process gas through the duct 60.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of controlling a sinter plant gas cleaning system having a pre-collector device and a fabric filter device for removing dust particles from a process gas drawn from a sinter strand of a sinter plant, the method comprising:
   measuring a concentration of organic compounds of the process gas drawn from the sinter strand, and
   passing a flow of the process gas having dust particles from the pre-collector device through at least one duct located between the pre-collector device and the fabric filter device; and
   controlling, based on the measured concentration of organic compounds of the process gas, a flow of process gas by-passing the fabric filter device, wherein the controlling, based on the measured concentration of organic compounds of the process gas, the flow of process gas by-passing the fabric filter device, comprises:
   determining a measured concentration of Non Methanic Volatile Organic Compounds (NMVOC) in the process gas prior to the process gas being sent to at least one of a stack and the fabric filter device;
   splitting the process gas having the dust particles into a first flow and a second flow such that 50% of the process gas is forwarded through to the fabric filter device as the first flow and 50% of the process gas bypasses the fabric filter device as the second flow of process gas when a measured concentration of NMVOC in the process gas is between 60 and 100 mg of NMVOC per $Nm^3$ of dry gas, the second flow of the process gas being the flow of process gas by-passing the fabric filter device;
   sending an entirety of the process gas having the dust particles to the fabric filter device so that 100% of the process gas is passed through the fabric filter device when the measured concentration of NMVOC in the process gas is between 0 and 60 mg of NMVOC per $Nm^3$ of dry gas; and
   sending an entirety of the process gas having the dust particles to a stack such that the entirety of the process gas bypasses the fabric filter device when the measured concentration of NMVOC in the process gas is greater than 100 mg of NMVOC per $Nm^3$ of dry gas, the process gas that bypasses the fabric filter device being the flow of process gas by-passing the fabric filter device.

2. The method according to claim 1, further comprising controlling, based on the measured concentration of organic compounds of the process gas, a supply of an additive comprising an alkaline substance to the process gas upstream of the fabric filter device.

3. The method according to claim 1, further comprising supplying an additive to the process gas upstream of the fabric filter device in an amount which corresponds to one of 100-1,000 mg of alkaline substance per $Nm^3$ of dry process gas and 200-400 mg of alkaline substance per $Nm^3$ of dry process gas.

4. The method according to claim 1, further comprising supplying an additive comprising an alkaline substance to the process gas upstream of the fabric filter device during at least 50% of the time that the process gas is allowed to pass through the fabric filter device.

5. The method according to claim 2, further comprising supplying an additive comprising an alkaline substance selected from a group of alkaline substances comprising: hydrated lime, $Ca(OH)_2$, limestone, $CaCO_3$, sodium carbonate, $Na_2CO_3$, sodium bicarbonate, $NaHCO_3$, fly ash collected from flue gases of a coal fired power boiler, fly ash collected from a biomass fired power boiler, and mixtures thereof.

6. The method according to claim 1, wherein the controlling the flow of process gas by-passing the fabric filter device further comprises comparing the measured concentration of organic compounds of the process gas to a set point, and increasing the amount of the process gas by-passing the fabric filter device when the measured concentration of organic compounds of the process gas exceeds the set point.

7. The method according to claim 1, further comprising comparing a measured concentration of NMVOC to a set point for NMVOC, the set point being 100 mg, or less, of NMVOC per $Nm^3$ dry process gas, and causing more than 50% of the process gas to by-pass the fabric filter device when the measured concentration of NMVOC exceeds the set point.

8. The method according to claim 1, further comprising recirculating at least a portion of an amount of dust particles collected in the fabric filter device and mixing the recirculated dust particles with process gas about to enter the fabric filter device.

9. The method according to claim 1, further comprising forwarding the process gas through the pre-collector device also when a flow of process gas by-passes the fabric filter device.

10. The method according to claim 1, comprising:
splitting the flow of the process gas having the dust particles into a first flow and a second flow;
passing the first flow through a reactor to supply an alkaline substance to that portion of the process gas prior to that portion being passed to the fabric filter device;
passing the first flow through the fabric filter device after the first flow passes through the reactor to collect the dust particles from the process gas of the first flow;
passing the second flow such that the second flow bypasses the fabric filter device the second flow of the process gas being the flow of the process gas by-passing the fabric filter device;
mixing the second flow with the process gas of the first flow after the first flow has passed through the fabric filter device; and
passing the mixed first and second flows to a stack.

11. The method of claim 1, wherein the determining of the measured concentration of NMVOC in the process gas prior to the process gas being sent to at least one of a stack and the fabric filter device comprises:
determining a total concentration of organic compounds in the process gas;
determining a concentration of methane in the process gas; and
subtracting the concentration of methane from the total concentration of organic compounds to determine the concentration of NMVOC in the process gas.

12. The method of claim 1, wherein the sinter plant gas cleaning system comprises:
a by-pass duct adapted to allow at least a portion of the process gas drawn from the sinter strand to by-pass the fabric filter device,
a measurement device for measuring a concentration of organic compounds of the process gas drawn from the sinter strand, and
a control system adapted to receive a signal from the measurement device and to control, in view of the signal received, the flow of process gas passing through the by-pass duct.

13. The method of claim 12, wherein the gas cleaning system comprises an additive supply system for supplying an additive comprising an alkaline substance to the process gas upstream of the fabric filter device.

14. The method of claim 12 wherein the control system is adapted to receive a signal from the measurement device and to control, in view of the signal received, an amount of additive comprising an alkaline substance supplied to the process gas by an additive supply system.

15. The method of claim 12, wherein the pre-collector device is fluidly connected in series with the by-pass duct such that dust particles are removed from the process gas also when a flow of process gas by-passes the fabric filter device.

16. The method of claim 15, wherein the pre-collector device comprises at least one of: an electrostatic precipitator and a multi-cyclone unit, and wherein the pre-collector device is arranged upstream, as seen with respect to a transport direction of the process gas, of the fabric filter device.

17. The method of claim 12, wherein the measurement device is adapted to measure the concentration of organic compounds in or upstream of a gas splitting point at which the process gas is distributed between the by-pass duct and the fabric filter device.

* * * * *